US012188370B2

(12) United States Patent
Takeuchi

(10) Patent No.: US 12,188,370 B2
(45) Date of Patent: Jan. 7, 2025

(54) ROTOR FOR RADIAL TURBINE

(71) Applicant: HONDA MOTOR CO., LTD., Tokyo (JP)

(72) Inventor: Yuta Takeuchi, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 18/428,452

(22) Filed: Jan. 31, 2024

(65) Prior Publication Data

US 2024/0318557 A1 Sep. 26, 2024

(30) Foreign Application Priority Data

Mar. 24, 2023 (JP) ................................ 2023-047749

(51) Int. Cl.

*F01D 5/04* (2006.01)
*F01D 5/14* (2006.01)
*F04D 29/24* (2006.01)

(52) U.S. Cl.

CPC ................ *F01D 5/04* (2013.01); *F01D 5/14* (2013.01); *F01D 5/142* (2013.01); *F04D 29/242* (2013.01); *F05D 2220/32* (2013.01); *F05D 2240/305* (2013.01)

(58) Field of Classification Search

CPC . F01D 5/04; F01D 5/141; F04D 29/24; F04D 29/242

See application file for complete search history.

(56) References Cited

U.S. PATENT DOCUMENTS 3,984,193 A * 10/1976 Yu .......................... F01D 5/048 416/185
4,543,041 A * 9/1985 French .................. F04D 29/284 416/183
4,676,718 A * 6/1987 Sarvanne ............ F04D 29/2244 416/185
8,096,777 B2 * 1/2012 Yokoyama ................ F01D 1/08 416/243
11,378,091 B2 * 7/2022 Sinico ................. F04D 29/2216
11,525,457 B2 * 12/2022 Honda .................. F04D 29/384
2020/0063567 A1 * 2/2020 Goodhand .............. F01D 5/141
2020/0088210 A1 * 3/2020 Honda ...................... F01D 5/04

FOREIGN PATENT DOCUMENTS

| | | | | | |
|---|---|---|---|---|---|
| CN | 109340177 | A | * | 2/2019 | ............. F04D 29/22 |
| CZ | 36307 | U1 | * | 8/2022 | |
| DE | 3704360 | A1 | * | 8/1988 | |
| DE | 102018212334 | A1 | * | 1/2020 | ............. F01D 5/048 |
| JP | 2013024055 | A | | 2/2013 | |

* cited by examiner

*Primary Examiner* — Christopher R Legendre

(74) *Attorney, Agent, or Firm* — Armstrong Teasdale LLP

(57) ABSTRACT

An impeller (58) for a radial turbine comprises a substantially conical hub (70), and a plurality of impeller blades (80) arranged along an outer periphery of the hub at regular intervals, wherein a tip end (80D) of each impeller blade is provided with a fin (82) projecting in a thickness-wise direction of the impeller blade over a prescribed region (X) extending along a chord length thereof from a first point (P1) at a first distance from an upstream end (80A) of the tip end to a second point (P2) at a second distance from a downstream end (80D) of the tip end.

15 Claims, 7 Drawing Sheets

ROTOR FOR RADIAL TURBINE

TECHNICAL FIELD

The present invention relates to a rotor for a radial turbine.

BACKGROUND ART

An impeller for a radial compressor or a centrifugal compressor typically comprises a substantially conical hub, and a plurality of impeller blades provided on the outer peripheral surface of the hub at regular intervals in the rotational direction, For the purpose of reducing the leakage of air via a gap created between the tip ends of the impeller blades and the shroud surrounding the impeller, it is known to provide to the tip end of each impeller blade a fin that extends tangentially. See JP2013-24055A, for instance.

FIG. 6B shows a leak flow FR and a loss region R at the tip end of a conventional rotor blade 100 of the radial turbine with a fin 102 that extends over the entire chord length thereof or from the upstream end 100A to the downstream end 100B of the rotor blade 100. In this case, the flow velocity of the leak flow FR is reduced over the entire chord length. As a result, the leak flow FR at the upstream end 100A passes through the loss region R that exists as a thin layer extending along the negative pressure surface of the rotor blade over an extended period of time. This causes an increase in energy loss due to the interference between the leak flow FR and the loss region R, and hence an increased loss in the adiabatic efficiency of the radial turbine.

BRIEF SUMMARY OF THE INVENTION

In view of such a problem of the prior art, a primary object of the present invention is to improve the efficiency of a rotor for a radial turbine by minimizing energy loss due to the interference between the leak flow and the loss region generated on the negative pressure side of the rotor blade.

To achieve such an object, the present invention provides a rotor (58) for a radial turbine, comprising: a substantially conical hub (70), and a plurality of rotor blades (80) arranged along an outer periphery of the hub at regular intervals, wherein a tip end (80D) of each rotor blade is provided with a fin (82) projecting in a thickness-wise direction of the rotor blade over a prescribed region (X) extending along a chord length thereof from a first point (P1) at a first distance from an upstream end (80A) of the tip end to a second point (P2) at a second distance from a downstream end (80D) of the tip end.

According to this aspect, owing to the absence of the fin in the parts of the tip end thereof at an upstream end part and a downstream end part along the chord length of each rotor blade, energy loss due to the interference between the leak flow and the loss region generated on the negative pressure side of the rotor blade is suppressed so that the efficiency of the radial turbine can be improved by reducing the energy loss due to the leak flow. Owing to the absence of the fin at the downstream end part, adverse influences on the succeeding blade by a wake flow can be minimized.

In this rotor, preferably, the prescribed region ranges from 15% to 90% of the chord length of the rotor blade, where the upstream end of the tip end of the rotor blade is defined as 0% and the downstream end of the tip end is defined as 100%.

According to this aspect, the energy loss due to the interference between the leak flow generated at the upstream end of the tip end and the loss region generated on the negative pressure side of the rotor blade is reduced and the adverse influences of the wake flow can be reduced so that the efficiency of the radial turbine can be improved.

In this rotor, preferably, each fin is configured such that $2 \leq T100/T80 \leq 5$ over a range of 40 to 70% along the chord length, where T100 is a dimension of the fin as measured in a tangential direction at the tip end of the corresponding rotor blade, and T80 is a dimension of the fin as measured in a tangential direction at an 80% point of a height of the rotor blade.

Thereby, the efficiency of the radial turbine can be improved in a particularly favorable manner.

In this rotor, preferably, an outer circumferential surface (82E) of the fin substantially coincides with a rotational locus of the tip end of the rotor blade.

According to this aspect, the gap between the inner circumferential surface of the shroud surrounding the rotor and the outer circumferential surface of the fin can be minimized without causing interference so that the leak flow rate of air flowing through the gap is minimized.

In this rotor, preferably, the fin is provided on a negative pressure side and/or a positive pressure side of each rotor blade.

According to this aspect, there are many options regarding the arrangement of the fins, and the degree of freedom in designing the rotor increases.

In this rotor, preferably, a projecting length of each fin progressively increases smoothly from an upstream end of the fin toward an intermediate point thereof along the chord length, and progressively decreases smoothly from the intermediate point toward a downstream end of the fin.

According to this aspect, deterioration of the flow field that could be otherwise caused by discontinuous thickness changes of the fins is avoided. Furthermore, the provision of the fins prevents from causing stress to be concentrated in the rotor blades, thereby improving the durability of the rotor blades.

In this rotor, preferably, a projecting length of each fin progressively increases smoothly from a base end to a free end thereof along a height of the corresponding rotor blade.

Thereby, the flow field around each fin is prevented from being disturbed, and an increase in efficiency can be achieved. Furthermore, the provision of the fins prevents stress to be concentrated in the rotor blades so that the durability of the rotor blades can be improved.

In this rotor, preferably, each fin ranges from 80% to 100% of a blade height with a base end of the rotor blade defined as 0% and the tip end of the rotor blade defined as 100%.

Thereby, the fin can favorably improve the performance of the rotor.

In this rotor, preferably, each fin is configured such that $T100/T80 \leq 1$ over a range of 0 to 15% along the chord length, $2 \leq T100/T80 \leq 5$ over a range of 40 to 70% along the chord length, and $T100/T80 \leq 1$ over a range of 90 to 100% along the chord length, where the upstream end of the tip end of the rotor blade is defined as 0% and the downstream end of the tip end is defined as 100%, and where T100 is a dimension of the fin as measured in a tangential direction at the tip end of the corresponding rotor blade, and T80 is a dimension of the fin as measured in a tangential direction at an 80% point of a height of the rotor blade.

Thereby, energy loss due to the interference between the leak flow and the loss region generated on the negative pressure side of the rotor blade is suppressed in a particularly favorable manner so that the efficiency of the radial turbine can be favorably improved by reducing the energy loss due to the leak flow.

In this rotor, preferably, the rotor consists of a splitter blade rotor which includes full blades and splitter blades arranged along the outer periphery of the hub at regular intervals in an alternating manner, and wherein a tip end (80D) of each full blade is provided with a fin (82) projecting in a thickness-wise direction of the full blade over a prescribed region (X) extending along the chord length thereof from a first point (P1) at a first distance from an upstream end (80A) of the tip end to a second point (P2) at a second distance from a downstream end (80B) of the tip end, and a tip end (90D) of each splitter blade is provided with a fin (92) projecting in a thickness-wise direction of the splitter blade over a prescribed region extending along a chord length thereof from a third point at a third distance from an upstream end (90A) of the tip end to a fourth point at a downstream end (90B) of the tip end or at a fourth distance from a downstream end (90B) of the tip end.

Thereby, energy loss due to the interference between the leak flow and the loss region generated on the negative pressure side of the rotor blade is suppressed in a particularly favorable manner so that the efficiency of the radial turbine can be favorably improved by reducing the energy loss due to the leak flow. In this case, the third distance may be substantially equal to the first distance of the full blade.

The present invention thus improves the efficiency of a rotor for a radial turbine by minimizing energy loss due to the interference between the leak flow and the loss region generated on the negative pressure side of the rotor blade.

BRIEF DESCRIPTION OF THE DRAWINGS

Now the present invention is described in the following with reference to the appended drawings, in which.

DETAILED DESCRIPTION OF THE PREFERRED EMBODIMENT(S)

Figure 1:
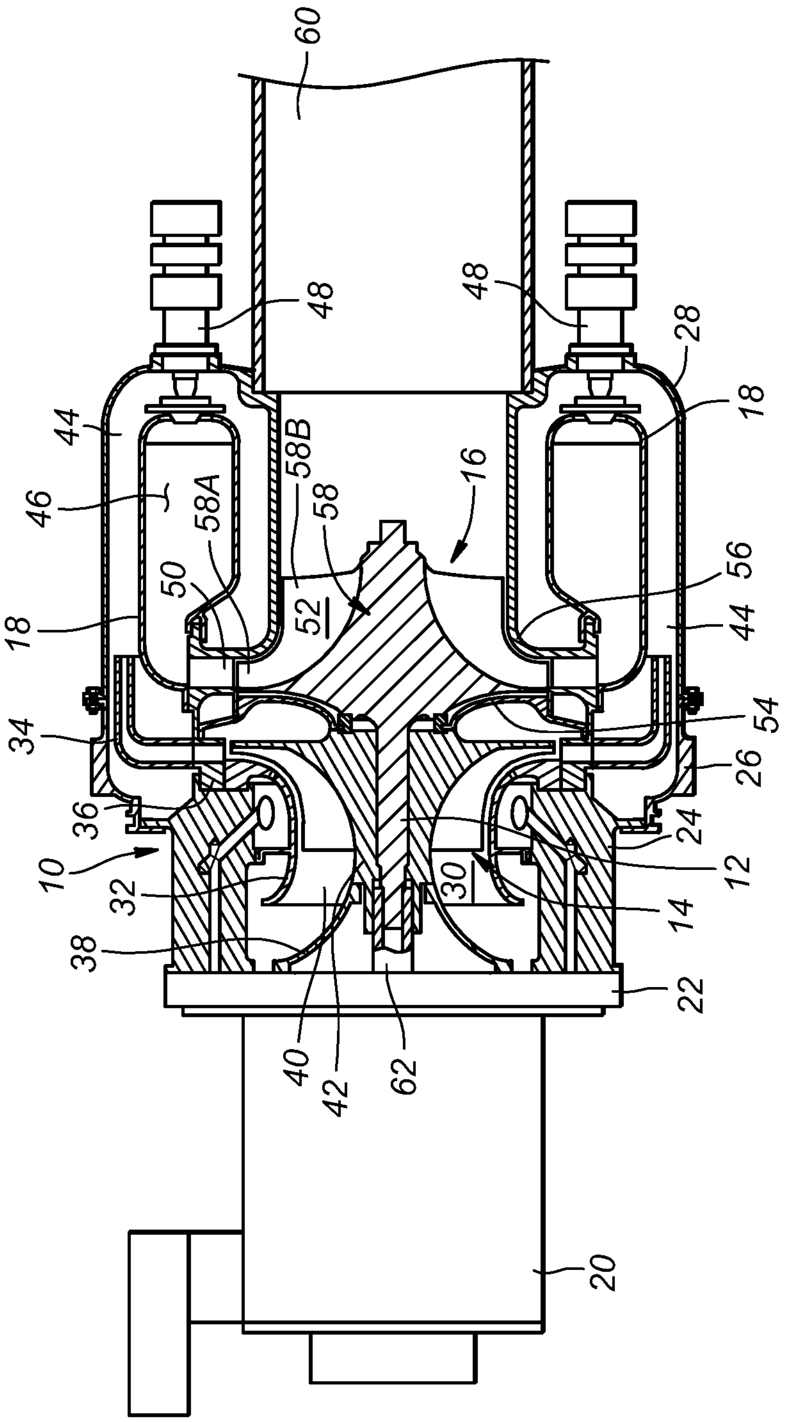
FIG. 1 is a sectional view of a power generation gas turbine system equipped with a radial turbine rotor according to an embodiment of the present embodiment.

FIG. 1 is a sectional view showing a gas turbine system 10 for power generation that includes a radial compressor 14 (centrifugal compressor) and a radial turbine 16 which is coaxially connected to the radial compressor 14 via a rotating shaft 12. The rotating shaft 12 is further connected to an input shaft 62 of a generator 20 in a coaxial relationship.

The gas turbine system 10 is generally covered by a housing that includes a front end plate 22 adjoining the generator 20, a front housing part 24, an intermediate housing part 26, and a rear housing part 28, which are connected to each other in the axial direction in this order. The front housing part 24, the intermediate housing part 26, and the rear housing part 28 are generally tubular in shape, and coaxial to one another.

The radial compressor 14 is provided with a compressor shroud 32 which is substantially tubular in shape and attached to the front housing part 24 in a concentric manner so as to define a compressor chamber 30 therein, a diffuser fixing member 36 attached to the compressor shroud 32 to support a diffuser 34, and an air intake guide member 38 attached to the front end plate 22 in a concentric manner so as to define an annular air intake opening 40 in cooperation with the compressor shroud 32. A compressor impeller 42 is attached to the rotating shaft 12 so as to be rotatable in the compressor chamber 30. The compressor impeller 42 is rotationally driven by the rotating shaft 12 which forms the output shaft of the radial turbine 16.

The radial compressor 14 takes in air (outside air) from the air intake opening 40, compresses and pressurizes the air through the rotation of the compressor impeller 42, and blows out the compressed and pressurized air (compressed air) to the diffuser 34.

A combustor 18 is provided within the rear housing part 28 around the central axis of the rotating shaft 12. The rear housing part 28 includes a part that defines a compressed air passage 44 that directs the compressed air from the diffuser 34 to the combustor 18. The combustor 18 defines a combustion chamber 46 therein, and a fuel injection nozzle 48 is attached to the combustor 18 to inject fuel into the combustion chamber 46.

The fuel injected into the combustion chamber 46 by the fuel injection nozzle 48 is mixed with the compressed air supplied from the radial compressor 14, and is combusted so that high-pressure combustion gas is generated. A turbine nozzle 50 is provided at the gas outlet of the combustor 18.

The radial turbine 16 has a turbine chamber 52 defined in the rear housing part 28 and communicating with the gas outlet of the combustor 18. The turbine chamber 52 is separated from the compressor chamber 30 by a partition wall member 54. The side of the turbine chamber 52 that is remote from the partition wall member 54 is surrounded by a shroud 56. A radial turbine rotor 58 is provided in a rear end part of the rotating shaft 12 so as to be rotatable in the turbine chamber 52.

The turbine nozzle 50 has an annular shape surrounding the radial turbine rotor 58, and injects combustion gas toward the radial turbine rotor 58 radially inward and circumferentially. The radial turbine rotor 58 is rotationally driven by the combustion gas ejected from the turbine nozzle 50. The combustion gas that has rotationally driven the radial turbine rotor 58 is discharged into the atmosphere from an exhaust gas passage 60 defined by a tubular member connected to the rear end of the rear housing part 28 as exhaust gas.

The input shaft 62 of the generator 20 is connected to the rotating shaft 12 so that the generator 20 is rotationally driven by the rotating shaft 12 of the radial turbine 16 and generates electricity.

Next, details of the radial turbine rotor 58 will be described in the following with reference to FIGS. 2 to 4A.

The radial turbine rotor 58 includes a substantially conical hub 70 and a plurality of rotor blades arranged on an outer peripheral surface 70A of the hub 70 at regular intervals along the rotational direction of the turbine rotor 58.

The rotor blades consist of full blades 80 and splitter blades 90 that are arranged in an alternating manner. In the following description, the full blades 80 and the splitter blades 90 may be collectively referred to as turbine blades where appropriate.

Figure 2:
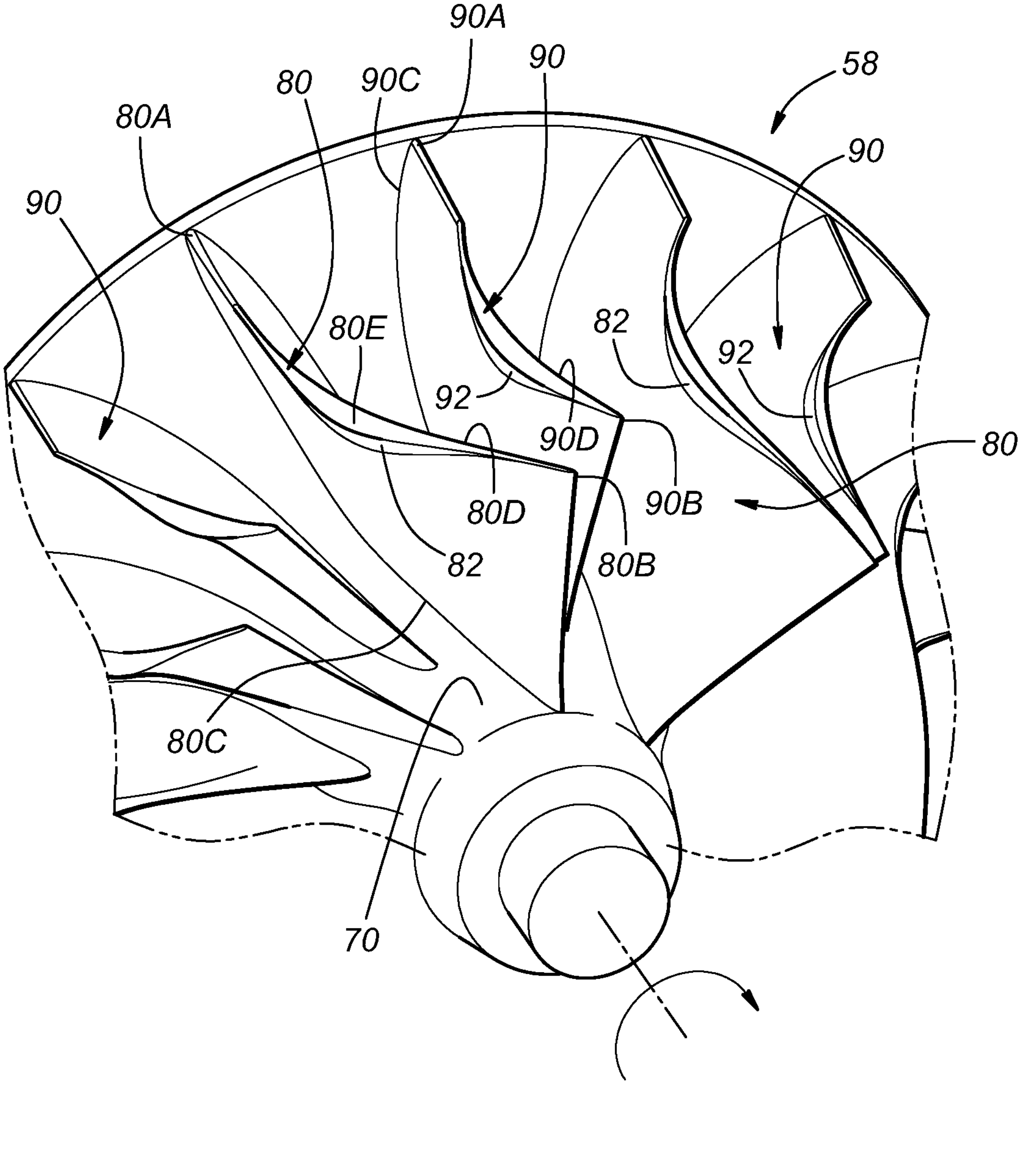
FIG. 2 is a fragmentary perspective view of the radial turbine rotor.

The rotational direction of the turbine rotor 58 is clockwise as viewed in FIG. 2. In the following description, the clockwise rotational direction of the turbine rotor 58 may be simply referred to as the rotational direction.

Each full blade 80 extends substantially over the entire length of the outer peripheral surface 70A of the hub 70 in the generatrix direction or the meridian direction thereof from the fluid inlet end 58A to the fluid outlet end 58B of the turbine rotor 58.

The fluid inlet end 58A of the turbine rotor 58 is located at a position corresponding to the turbine nozzle 50 (see FIG. 1). The fluid outlet end 58B of the turbine rotor 58 is located at a position corresponding to the exhaust gas passage 60 (see FIG. 1).

Each full blade 80 has an upstream end (leading edge) 80A located at the fluid inlet end 58A, a downstream end (trailing edge) 80B located at the fluid outlet end 58B, a root end (base end) 80C attached to the outer peripheral surface 70A of the hub 70 and extending between the upstream end 80A and the downstream end 80B, and a tip end (free edge) 80D extending between the upstream end 80A and the downstream end 80B on the side remote or opposite from the root end 80C adjacent to the inner circumferential surface of the shroud 56 (see FIG. 1).

Each splitter blade 90 has an upstream end (leading edge) 90A located at the fluid inlet end 58A, a downstream end (trailing edge) 90B located at a certain distance from the fluid outlet end 58B (or short of the fluid outlet end 58B by a certain distance), a root end (base end) 90C attached to outer peripheral surface 70A of the hub 70 and extending between the upstream end 90A and the downstream end 90B, and a tip end (free edge) 90D extending between the upstream end 90A and the downstream end 90B on the side remote or opposite from the root end 90C adjacent to the inner circumferential surface of the shroud 56 (see FIG. 1).

In regard to each of the full blades 80 and the splitter blades 90, the surface thereon on which the fluid pressure acts will be referred to as a positive pressure surface (side), and the opposite surface will be referred to as a negative pressure surface (side).

Figure 3:
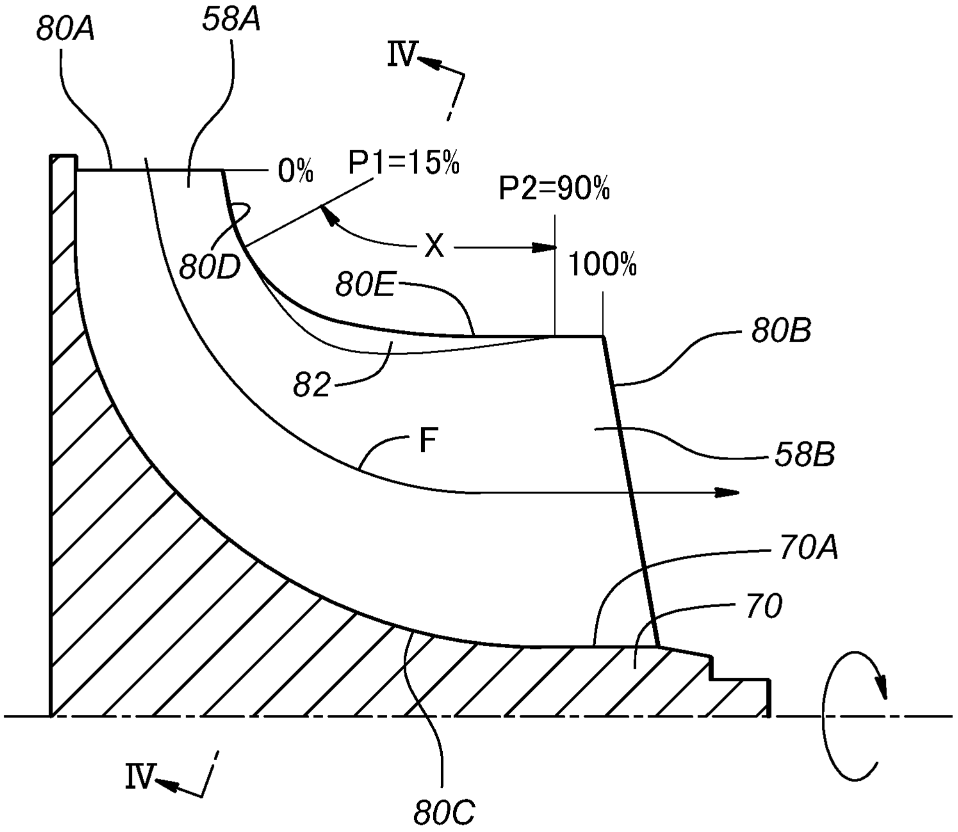
FIG. 3 is a meridian sectional view of the radial turbine rotor.
Figure 4A:
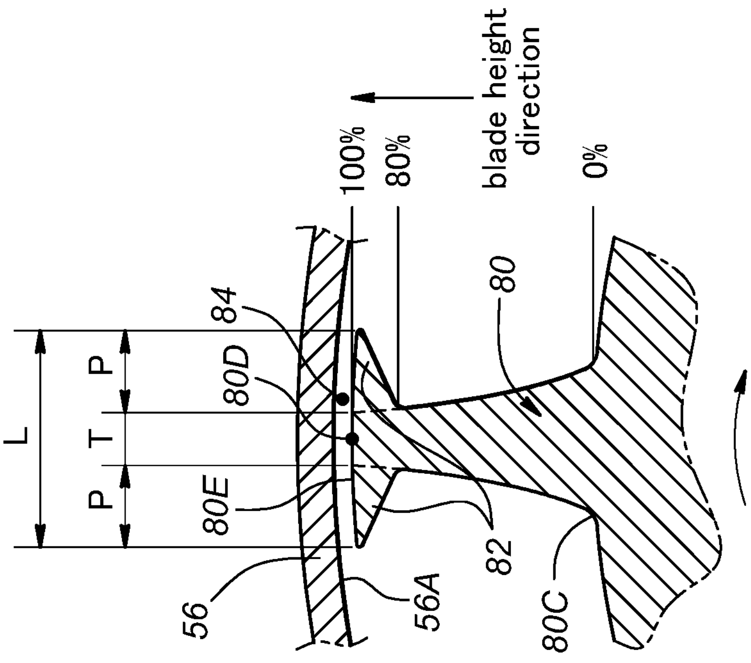
FIG. 4A is a fragmentary sectional view of a rotor blade with a fin extending in two directions.

As shown in FIG. 3, each full blade 80 is provided with a fin 82 projecting in the thickness-wise direction at the tip end 80D thereof over a predetermined region X that extends from a point P1 located at a first distance from the upstream end 80A to a point P2 located at a second distance from the downstream end 80B. In this embodiment, the fin 82 extends both on the negative pressure side and the positive pressure side of the full blade 80 as shown in FIG. 4A.

The predetermined region X where the fin 82 is provided may range over 15% to 90% of the chord length of the full blade 80 with the positions of the upstream end 80A of the tip end 80D defined as 0% and the downstream end 80B of the tip end 80D defined as 100%. The intermediate points are defined in proportion to the percentage of the distance from the upstream end 80A to the downstream end 80B of the tip end 80D.

Figure 5:
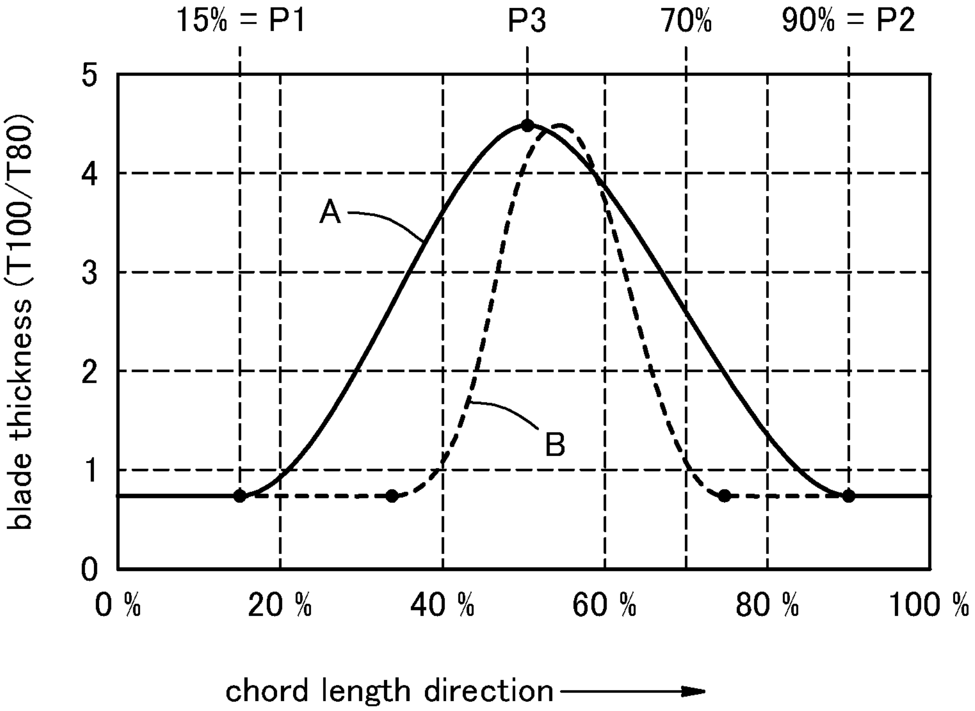
FIG. 5 is a graph showing the change in the blade thickness (projecting length of the fin) along the chord length of the blade.

As shown by line A in the graph of FIG. 5, the projecting length of the fin 82 (the blade thickness) at the tip end thereof progressively increases smoothly from the point P1 to the point P3 of the full blade 80 and progressively decreases smoothly from the point P3 to the point P2 without any abrupt change. Here, as shown in FIG. 4A, the projecting length L of the fin 82 of each full blade 80 may also be considered as a sum of the thickness T of the tip end of the full blade 80, and twice the length P of each projecting part from the tip end of the full blade 80. The same is true with the splitter blades 90.

In other words, the projecting length L of the fin 82 (or the blade thickness of the full blade 80 at the tip end) referred to here is the dimension of the fin 82 as measured along the rotational direction (tangential direction) of the rotor 58.

As shown in FIG. 4A, the projecting length of the fin 82 smoothly increases along the height of the full blade 80 from the base end part to the tip end part thereof.

The radially outer surface of the fin 82 may consist of a cylindrical (or conical surface) defining a small gap relative to the inner circumferential surface 56A of the compressor shroud 32. The radially outer surface of the fin 82 may also be considered as a rotational locus of the tip end of the full blade 80.

As shown in FIG. 4A, the length of the gap 84 (path length) created between the tip end 80D of the full blade 80 and the inner circumferential surface 56A of the compressor shroud 56 as measured in the rotor rotational direction increases owing to the presence of the fin 82 on both the positive pressure side and the negative pressure side of the tip end 80D of the full blade 80 as compared to the case where no fin is provided at the tip end 80D. This increases the flow resistance of the air leaking from the positive pressure side to the negative pressure side of the full blade 80 through the gap 84, and reduces the leak flow rate of the air flowing through the gap 84.

The outer circumferential surface 80E of each fin 82 may be planar, but more preferably consists of an arcuate surface extending along the rotational locus of the tip end 80D. Thereby, even though the path length of the gap 84 is long, the size of the gap 84 is uniformly reduced along the rotor rotational direction without the outer circumferential surface 80E of the fin 82 interfering with the inner circumferential surface 56A of the shroud 56.

By reducing the leak flow, energy loss (leakage loss) due to gas leakage is reduced, and the adiabatic efficiency of the radial turbine 16 is improved.

Figure 6A:
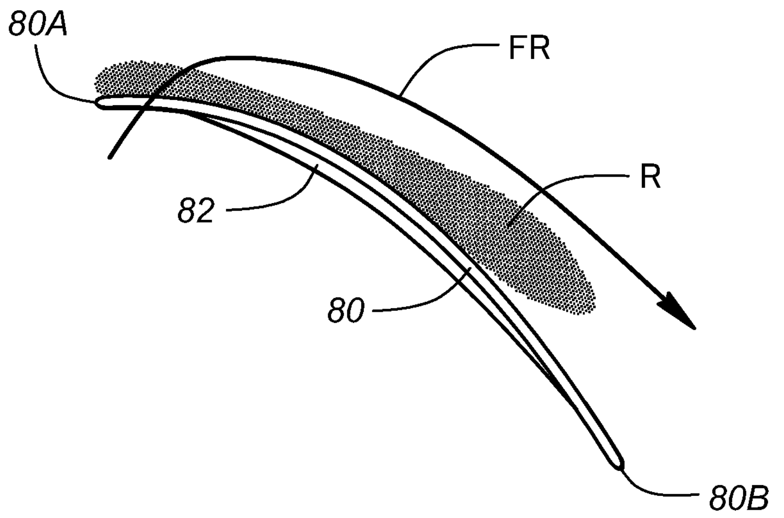
FIG. 6A is a diagram illustrating the interference between the leak flow FR and the loss region R according to the present invention.
Figure 6B:
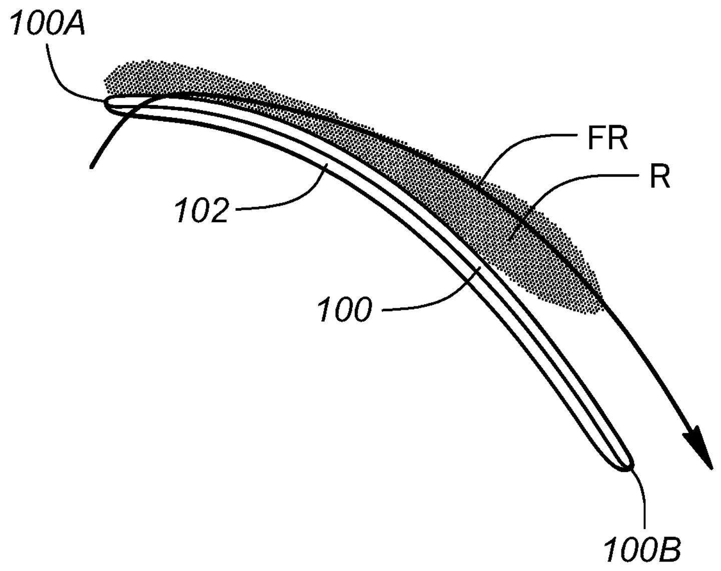
FIG. 6B is a view similar to FIG. 6A according to the prior art.

In this embodiment, since the fin 82 is not provided in the gas inlet region or the range extending between 0% to 15% of the chord length of the full blade 80, the flow velocity of the leak flow in this region is prevented from being slowed down. As a result, as shown in FIG. 6A, the leak flow FR passes across the loss region R in a direction intersecting the extending direction of the loss region R generated on the negative pressure side of the full blade 80 via a relatively short path so that the energy loss due to the interference between the leak flow FR and the loss region R can be minimized, and the adiabatic efficiency of the radial turbine 16 can be improved.

The fin 82 is absent in the range of 90% to 100% along the chord length of the full blade 80 so that the wake flow of the full blade 80 is prevented from become thick, and the performance of the blades or the ducts on the trailing side is prevented from being impaired.

Since the projecting length of the fin 82 at the tip end 80D of each full blade 80 progressively increases smoothly from the point P1 to the point P3 along the chord length of the full blade 80 and progressively decreases smoothly from the point P3 to the point P2 along the chord length of the full blade 80 without any abrupt change as shown by line A in the graph of FIG. 5, the presence of the fins 82 is prevented from causing any significant disturbance in the flow field as well as any stress concentration that may adversely affect the durability of the full blades 80.

Further, since the projecting length of each fin 82 gradually increases from the root end 80C side to the tip end 80D side of the full blade 80, the stress generated in the full blade 80 due to the presence of the fin 82 is prevented from changing abruptly along the blade height direction. Thus, the presence of the fins 82 is prevented from causing any disturbance in the flow field as well as any stress concentration that may adversely affect the durability of the full blades 80.

Furthermore, each fin 82 ranges from 80% to 100% of the blade height with the base end of the rotor blade defined as 0% and the tip end of the rotor blade defined as 100%. The intermediate points are defined in proportion to the percentage of the height from the base end to the tip end as shown in FIG. 4A.

Thereby, the provision of the fins 82 to the full blades 80 does not cause any significant concentration of stress.

According to a particularly preferred embodiment of the present invention, each fin 82 is configured such that $T100/T80 \leq 1$ over a range of 0 to 15% along the chord length, $2 \leq T100/T80 \leq 5$ over a range of 40 to 70% along the chord length, and $T100/T80 \leq 1$ over a range of 90 to 100% along the chord length, where T100 is the dimension of the fin 82 as measured in a tangential direction at the tip end of the corresponding rotor blade, and T80 is the dimension of the fin 82 as measured in a tangential direction at an 80% point of a height of the rotor blade.

Thereby, the leakage loss can be minimized without causing any significant increase in the stress that is produced in each full blade.

According to an alternate embodiment of the present invention regarding the case where the fins 82 are provided in a relatively limited range, as shown by the curve B in FIG. 5, each fin 82 is configured such that $2 \leq T100/T80 \leq 5$ over a range of 40 to 70% along the chord length. The fin 82 may be provided over the range of 40 to 70% along the chord length.

As shown in FIG. 2, each splitter blade 90 is provided with a fin 92 which extends in the rotor rotational direction (the thickness-wise direction of the splitter blade 90) over a predetermined region that ranges from a point at a certain distance from the upstream end 90A thereof to the downstream end 90B thereof. Alternatively, the fin 92 may be provided over a region ranging from a point at a first distance from the upstream end 90A thereof to a point at a certain distance from the downstream end 90B thereof.

The fin 92 again extends on both the positive pressure side and the negative pressure side of the splitter blade 90 in a symmetric manner.

In this embodiment, the fin 92 is provided over a region ranging from about 15% of the chord length of the full blade 80 to the downstream end of the splitter blade 90.

Alternatively, the downstream end of the fin 92 may be terminated at a point at a certain distance from the downstream end of the tip end of the splitter blade 90.

Similar to the full blades 80, the projecting length of the fin 92 provided at the tip end 90D of each splitter blade 90 progressively increases smoothly from the upstream side to the intermediate part along the chord length, and progressively decreases smoothly from the intermediate part to the downstream side.

Again, the projecting length of the fin 92 of each splitter blade 90 may also be considered as a sum of the thickness of the tip end of the splitter blade 90, and twice the length of each projecting part from the tip end of the splitter blade 90.

The blade thickness of the splitter blade 90 at the tip end 90D or the dimension of the fin 92 in the rotational direction progressively increases smoothly from the side of the root end 90C to the side of the tip end 90D.

The outer peripheral surface of the fin 92 including the tip end 90D of the splitter blade 90 consists of an arcuate or conical surface extending along the rotational locus of the tip end 90D. In other words, the outer peripheral surface of the fin 92 including the tip end 90D of the splitter blade 90 consists of an arcuate or a conical surface concentric to the rotational center of the turbine rotor 58.

The length of the gap created between the tip end 90D of the splitter blade 90 and the inner circumferential surface 56A of the compressor shroud 56 as measured in the rotor rotation direction (path length) increases owing to the presence of the fin 92 on both the positive pressure side and the negative pressure side of the tip end 90D of the splitter blade 90 as compared to the case where no fin 92 is provided at the tip end 90D. This increases the flow resistance of the air leaking from the positive pressure side to the negative pressure side of the splitter blade 90 through the gap, and reduces the leak flow rate of the air flowing through the gap.

The outer circumferential surface 80E of each fin 92 may be planar, but more preferably consists of an arcuate surface extending along the rotational locus of the tip end 90D. Thereby, even though the passage length of the gap is long, the size of the gap is uniformly reduced in the rotor rotational direction without the outer circumferential surface 80E of the fin 92 interfering with the inner circumferential surface 56A of the shroud 56. This also reduces the leak flow rate of the gas flowing through the gap.

By reducing the leak flow, energy loss (leakage loss) due to gas leakage is reduced, and the adiabatic efficiency of the radial turbine 16 is improved.

Since the fin 92 of each splitter blade 90 is not provided in the gas inlet region ranging from 0% to 15% of the chord length of the full blade 80, the flow velocity of the leak flow in this region is prevented from being reduced. As a result, as in the case of the full blade 80, the leak flow passes across the loss region R in a direction intersecting the extending direction of the loss region R generated on the negative pressure side of the splitter blade 90 via a short path. As a result, in the case of the splitter blades 90 as well, energy loss due to interference between the leak flow FR and the loss region R is reduced, and the adiabatic efficiency of the radial turbine 16 can be improved.

Since the trailing edge of each splitter blade 90 terminates at a certain distance from the gas outlet region, the wake flow of each splitter blade 90 is prevented from becoming thick, and any adverse influences on the succeeding blades and ducts can be avoided.

Since the projecting length of the fin 82 at the tip end 90D of each splitter blade 90 smoothly increases from the upstream end thereof to the intermediate point, and smoothly decreased from the intermediate point to the downstream end thereof, the stress in the splitter blade 90 is prevented from changing sharply along the chord length thereof so that the durability of the splitter blade 90 can be improved. Further, impairment of fluid flow due to abrupt change in the projecting length of the splitter blade 90 can be avoided.

Further, since the projecting length of the fin 92 smoothly increases from the root end 90C side thereof toward the tip end 90D side thereof, the stress generated in the splitter blade 90 due to the provision of the fin 92 is prevented from changing abruptly along the blade height direction. This also prevents stress concentration which could be otherwise caused by the provision of the fins 92 so that the durability of the splitter blade 90 can be improved. Furthermore, this prevents impairment of flow field due to abrupt change in the projecting length of the fins 92.

According to a particularly preferred embodiment of the present invention, the fin 92 of each splitter blade 90 is configured such that T100/T80≤1 over a range of 0 to 15% along the chord length (of the full blade 80), and 2≤T100/T80≤5 over a range of 40 to 70% along the chord length (of the full blade 80), where T100 is a dimension of the fin as measured in a tangential direction at the tip end of the corresponding rotor blade, and T80 is a dimension of the fin as measured in a tangential direction at an 80% point of a height of the rotor blade.

Thereby, the leak flow FR passes across the loss region R in a direction intersecting the extending direction of the loss region R generated on the negative pressure side of the splitter blade 90 via a relatively short path so that the energy loss due to the interference between the leak flow FR and the loss region R can be minimized, and the adiabatic efficiency of the radial turbine 16 can be improved.

Further, the blade thickness of the splitter blade 90 at the tip end 90D or the dimension of the fin 92 in the rotational direction smoothly increases from the side of the root end 90C to the side of the tip end 90D.

Thereby, any stress concentration due to the provision of the fin 92 can be avoided.

Figure 7:
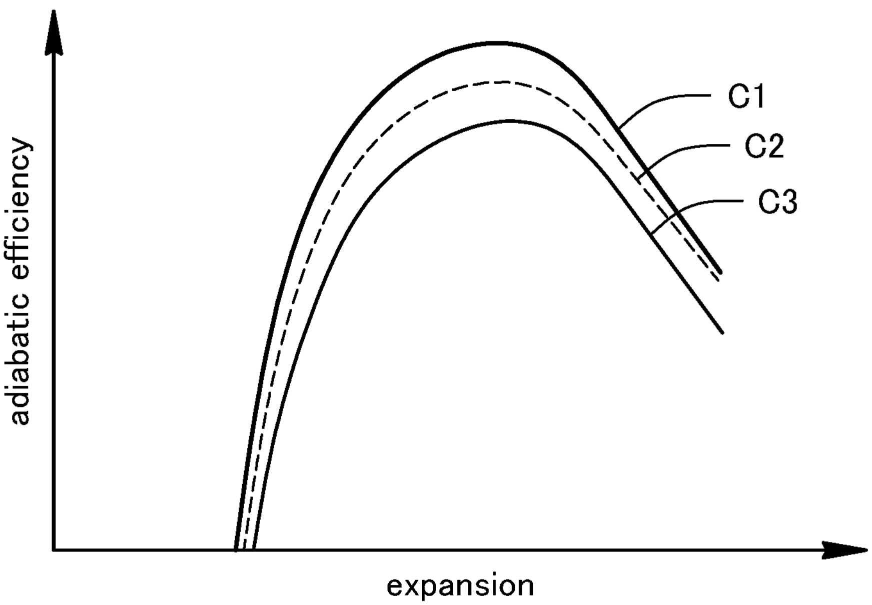
FIG. 7 is a graph comparing the adiabatic efficiencies of cases where the fin is provided according to the present invention (C1), no fin is provided (C2), and the fin is provided over the entire chord length (C3).

FIG. 7 shows the adiabatic efficiency in relation to the expansion ratio of this embodiment and conventional examples. The characteristic line C1 corresponds to the case where the fins 82 and 92 are provided as represented by the graph shown in FIG. 5. The characteristic line C2 represents the case where no fin is provided on the rotor blades. The characteristic line C3 represents the case where the fins are provided on the rotor blades over the entire chord length.

It can be seen from this graph that the rotor of the present invention demonstrates an improved adiabatic efficiency over a wide range of expansion ratio as compared to the rotors of the prior art.

The present invention has been described in terms of a specific embodiment, but is not limited by such an embodiment, and can be modified in various ways without departing from the scope of the present invention.

For instance, the configuration of the hub 70 and the numbers of the full blades 80 and splitter blades 90 can be changed without departing from the scope of the present invention.

Figure 4B:
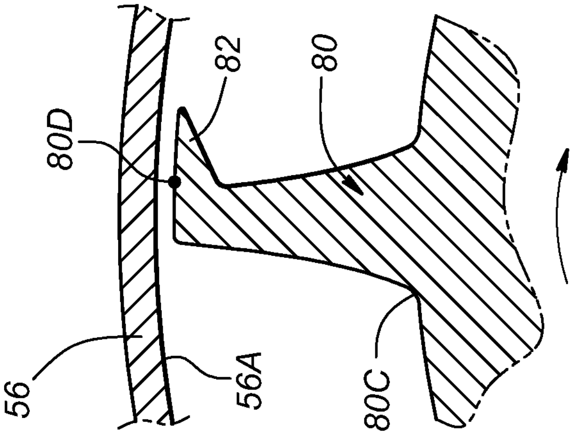
FIG. 4B is a view similar to FIG. 4B showing a rotor blade with a fin extending the leading direction.
Figure 4C:
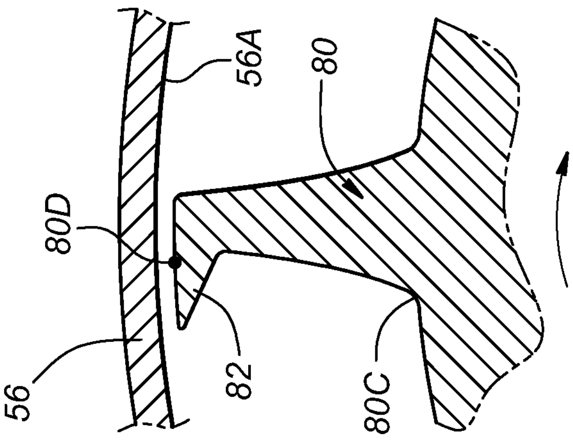
FIG. 4C is a view similar to FIG. 4B showing a rotor blade with a fin extending the trailing direction.

Further, according to the broad concept of the present invention, the fins 82 of the full blades 80 may not be provided on both the positive pressure side and the negative pressure side in a symmetric fashion, but only on the negative pressure side as shown in FIG. 4B or only on the positive pressure side as shown in FIG. 4C. The same is true with the fins 92 of the splitter blades 90.

Also, the fins 82 may be provided only on the full blades 80 and not on the splitter blades 90.

The blades of the rotors 58 may strictly consist of full blades 80 which are each provided with a fin 82.

The radial turbine rotor 58 of the present invention is not limited to that for a power generation gas turbine system 10 but may also be applied to radial turbines for other applications.

The invention claimed is:

1. A rotor for a radial turbine, comprising:

a hub, wherein the hub narrows from a large diameter at an inlet of the rotor to a small diameter at an outlet of the rotor, and a plurality of rotor blades arranged along an outer periphery of the hub at regular intervals, wherein a tip end of each rotor blade is provided with a fin projecting in a thickness-wise direction of the respective rotor blade over a prescribed region extending along a chord length thereof from a first point at a first distance from an upstream end of the respective tip end to a second point at a second distance from a downstream end of the respective tip end, wherein each prescribed region ranges from 15% to 90% of the chord length of the respective rotor blade, where the upstream end of the respective tip end of the rotor blade is defined as 0% and the downstream end of the respective tip end is defined as 100%, and wherein each fin is configured such that 2≤T100/T80≤5 over a range of 40 to 70% along the chord length, where T100 is a dimension of each fin as measured in a tangential direction at the tip end of the respective rotor blade, and T80 is a dimension of each fin as measured in a tangential direction at an 80% point of a height of the respective rotor blade.

2. The rotor according to claim 1, wherein an outer circumferential surface of each fin extends along a rotational locus of the tip end of the respective rotor blade.

3. The rotor according to claim 1, wherein each fin is provided on a negative pressure side and/or a positive pressure side of the respective rotor blade.

4. The rotor according to claim 1, wherein a projecting length of each fin progressively increases smoothly from an upstream end of the respective fin toward an intermediate point thereof along the chord length, and progressively decreases smoothly from the intermediate point toward a downstream end of the respective fin.

5. The rotor according to claim 1, wherein a projecting length of each fin progressively increases smoothly from a base end to a free end thereof along a height of the respective rotor blade.

6. The rotor according to claim 1, wherein each fin ranges from 80% to 100% of a height of the respective blade with a base end of the respective rotor blade defined as 0% and the tip end of the respective rotor blade defined as 100%.

7. The rotor according to claim 1, wherein the blades are full blades, and further comprising a plurality of splitter blades, wherein the full blades and the splitter blades are arranged in an alternating manner at regular intervals, and a tip end of each splitter blade is provided with a fin projecting in a thickness-wise direction of the respective splitter blade over a prescribed region extending along a chord length thereof from a third point at a third distance from an upstream end of the tip end of the respective splitter blade to a fourth point at a downstream end of the tip end of the respective splitter blade or at a fourth distance from a downstream end of the tip end of the respective splitter blade.

8. A rotor for a radial turbine, comprising:

a hub, wherein the hub narrows from a large diameter at an inlet of the rotor to a small diameter at an outlet of the rotor, and a plurality of rotor blades arranged along an outer periphery of the hub at regular intervals, wherein a tip end of each rotor blade is provided with a fin projecting in a thickness-wise direction of the respective rotor blade over a prescribed region extending along a chord length thereof from a first point at a first distance from an upstream end of the respective tip end to a second point at a second distance from a downstream end of the respective tip end, wherein, for each blade, the respective fin is configured such that:

$T100/T80 \leq 1$ over a range of 0 to 15% along the chord length, $2 \leq T100/T80 \leq 5$ over a range of 40 to 70% along the chord length, and $T100/T80 \leq 1$ over a range of 90 to 100% along the chord length, where the upstream end of the tip end of the rotor blade is defined as 0% and the downstream end of the tip end is defined as 100%, and where T100 is a dimension of the fin as measured in the thickness-wise direction at the tip end of the corresponding rotor blade, and T80 is a dimension of the fin as measured in the thickness-wise direction at an 80% point of a height of the rotor blade.

9. The rotor according to claim 8, wherein each prescribed region ranges from 15% to 90% of the chord length of the respective rotor blade.

10. The rotor according to claim 8, wherein an outer circumferential surface of each fin extends along a rotational locus of the tip end of the respective rotor blade.

11. The rotor according to claim 8, wherein each fin is provided on a negative pressure side and/or a positive pressure side of respective rotor blade.

12. The rotor according to claim 8, wherein a projecting length of each fin progressively increases smoothly from an upstream end of the respective fin toward an intermediate point thereof along the chord length, and progressively decreases smoothly from the intermediate point toward a downstream end of the respective fin.

13. The rotor according to claim 8, wherein a projecting length of each fin progressively increases smoothly from a base end to a free end thereof along a height of the respective rotor blade.

14. The rotor according to claim 8, wherein each fin ranges from 80% to 100% of a height of the respective blade with a base end of the respective rotor blade defined as 0% and the tip end of the respective rotor blade defined as 100%.

15. The rotor according to claim 8, wherein the blades are full blades, and further comprising a plurality of splitter blades, wherein the full blades and the splitter blades are arranged in an alternating manner at regular intervals, and a tip end of each splitter blade is provided with a fin projecting in a thickness-wise direction of the respective splitter blade over a prescribed region extending along a chord length thereof from a third point at a third distance from an upstream end of the tip end of the respective splitter blade to a fourth point at a downstream end of the tip end of the respective splitter blade or at a fourth distance from a downstream end of the tip end of the respective splitter blade.

* * * * *